United States Patent [19]

Tatsumi et al.

[11] Patent Number: 4,760,388
[45] Date of Patent: Jul. 26, 1988

[54] METHOD AND AN APPARATUS FOR DISPLAYING A UNIFIED PICTURE ON CRT SCREENS OF MULTIPLE DISPLAYING DEVICES

[75] Inventors: Yoshihiro Tatsumi, Kashiwara; Masaaki Nagafune; Takao Shimizu, both of Kashihara, all of Japan

[73] Assignee: Tatsumi Denshi Kogyo Kabushiki Kaisha, Osaka, Japan

[21] Appl. No.: 495,663

[22] Filed: May 18, 1983

[51] Int. Cl.⁴ .............................................. G09G 1/00
[52] U.S. Cl. .................................... 340/717; 340/750; 340/801; 340/814
[58] Field of Search ............... 340/720, 717, 716, 703, 340/721, 723, 705, 798, 814, 750; 358/240, 87; 364/521

[56] References Cited

U.S. PATENT DOCUMENTS

| | | | |
|---|---|---|---|
| 3,051,779 | 8/1962 | Lakjer | 358/87 |
| 3,289,196 | 11/1966 | Hull | 340/720 X |
| 3,492,419 | 1/1970 | Bartonik | 358/87 |
| 3,623,069 | 11/1971 | Malden | 340/717 |
| 3,641,558 | 2/1972 | Cook et al. | 340/711 X |
| 3,641,559 | 2/1972 | Hogan et al. | 340/711 X |
| 3,644,935 | 2/1972 | Lourie | 340/798 |
| 3,705,263 | 12/1972 | Rittenhouse | 340/721 X |
| 3,774,158 | 11/1973 | Clark | 340/717 X |
| 3,821,730 | 6/1974 | Carey et al. | 340/791 X |
| 3,909,525 | 9/1975 | Fagan | 358/87 X |
| 3,941,926 | 3/1976 | Slobodzian et al. | 358/240 |
| 4,119,953 | 10/1978 | Yeschick | 340/717 X |
| 4,262,338 | 4/1981 | Gaudio, Jr. | 340/701 X |
| 4,297,723 | 10/1981 | Whitby | 358/87 X |
| 4,322,726 | 3/1982 | Collier et al. | 340/701 X |
| 4,323,896 | 4/1982 | Fiedler et al. | 358/240 X |
| 4,368,485 | 1/1983 | Midland | 340/720 X |
| 4,399,434 | 8/1983 | Bielat | 340/701 |
| 4,427,977 | 1/1984 | Carollo | 340/705 |
| 4,495,594 | 6/1985 | Eggebrecht et al. | 364/521 X |
| 4,647,927 | 3/1987 | Ichikawa et al. | 340/801 |
| 4,667,190 | 5/1987 | Fant | 340/798 |

Primary Examiner—Marshall M. Curtis
Attorney, Agent, or Firm—Lowe, Price, LeBlanc, Becker & Shur

[57] ABSTRACT

A wide picture with on-the-scene feeling is displayed on multiple CRT screens by using a method which is suitable for video game machines to enhance a player's satisfaction. Data is read from a static memory and from a dynamic memory and is displayed in synchronism at corresponding points of the CRT's.

23 Claims, 8 Drawing Sheets

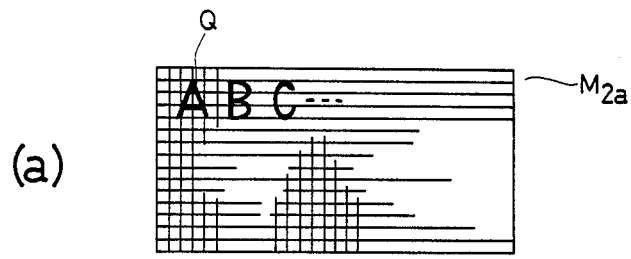
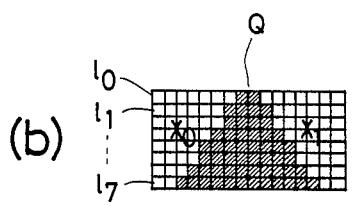
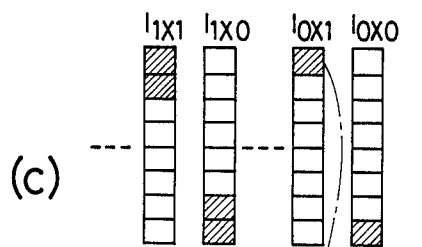
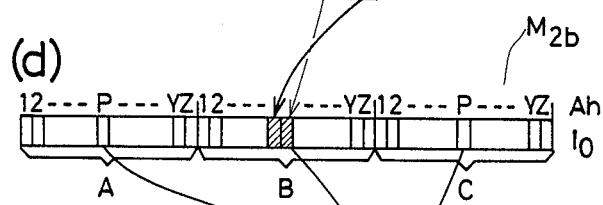
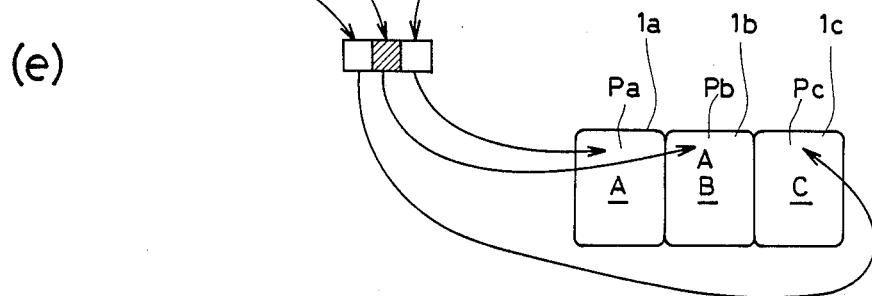
FIG. 2

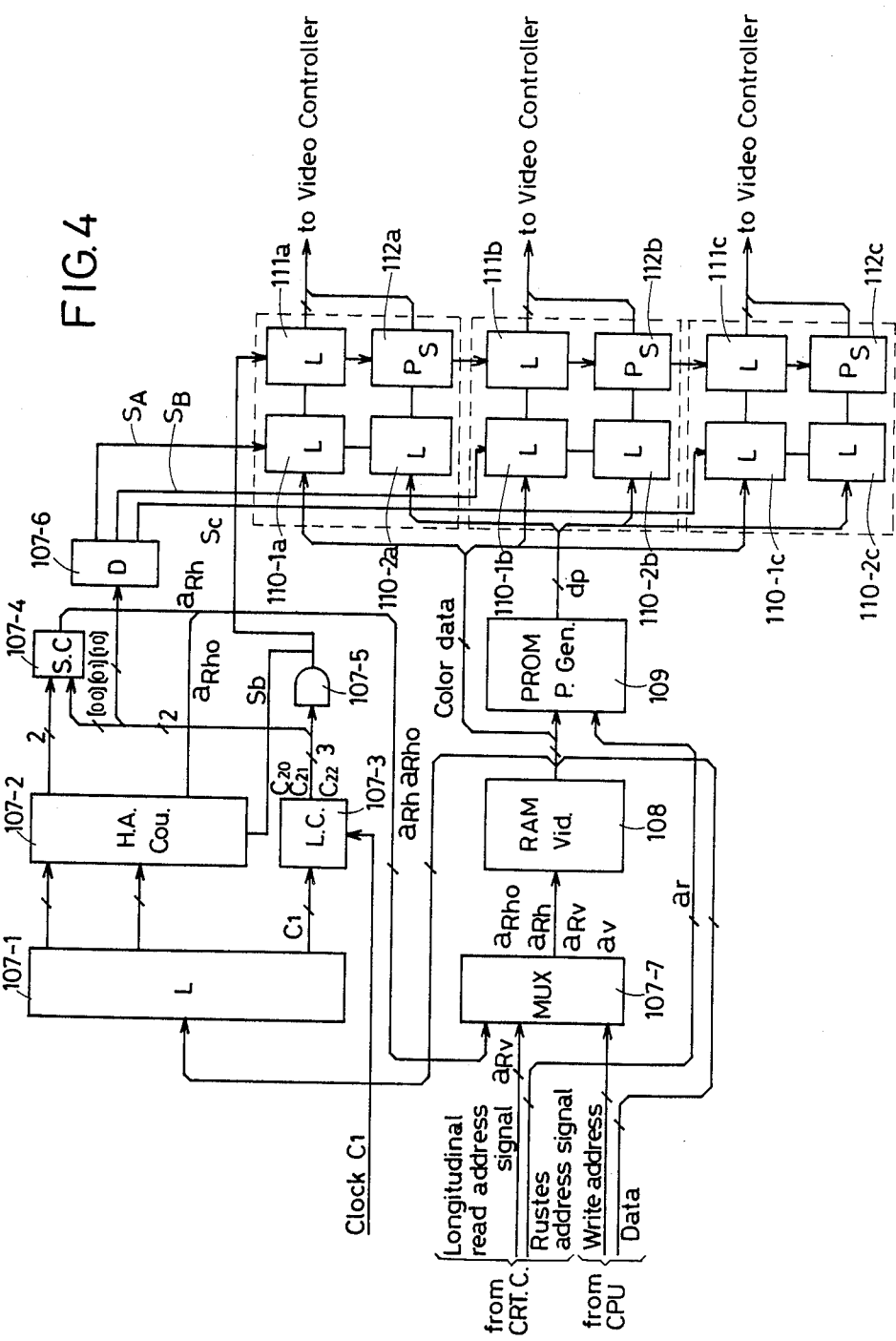

METHOD AND AN APPARATUS FOR DISPLAYING A UNIFIED PICTURE ON CRT SCREENS OF MULTIPLE DISPLAYING DEVICES

FIELD OF THE INVENTION

This invention relates to a method of displaying a unified picture on CRT screens of multiple display devices, especially to a method in which each of the display devices operates individually while maintaining a synchronous relation with each other, and to an apparatus embodying the method.

BACKGROUND OF THE INVENTION

In conventional television game machines, each game has only one CRT screen to display a moving picture. Such devices are satisfactory from a point of view of offering a challenge to the skill of a competitor, but do not offer players the increased satisfaction and excitement which can be produced with an on-the-screen feeling obtained by angled screens which surround the competitor.

SUMMARY OF THE INVENTION

In response to the above problem with conventional machines, this invention was proposed to get a method of displaying a unified picture on CRT screens of multiple displaying devices and an apparatus embodying the method.

This invention is characterized by displaying a unified picture on said CRT screen of multiple displaying devices each of which operates individually, to which are read synchronously from a memory a plurality of picture data, describes as "dots" hereinafter.

BRIEF DESCRIPTION OF THE DRAWINGS

The above and other objects and features of this invention will be appreciated more fully from the following detailed description when read with reference to the accompanying drawings.

FIG. 2 shows another method of this invention.

FIG. 4 is a detailed block diagram of a first picture disposition circuit.

PREFERRED EMBODIMENT OF THE INVENTION

The following description is based on drawings.

Figure 1:
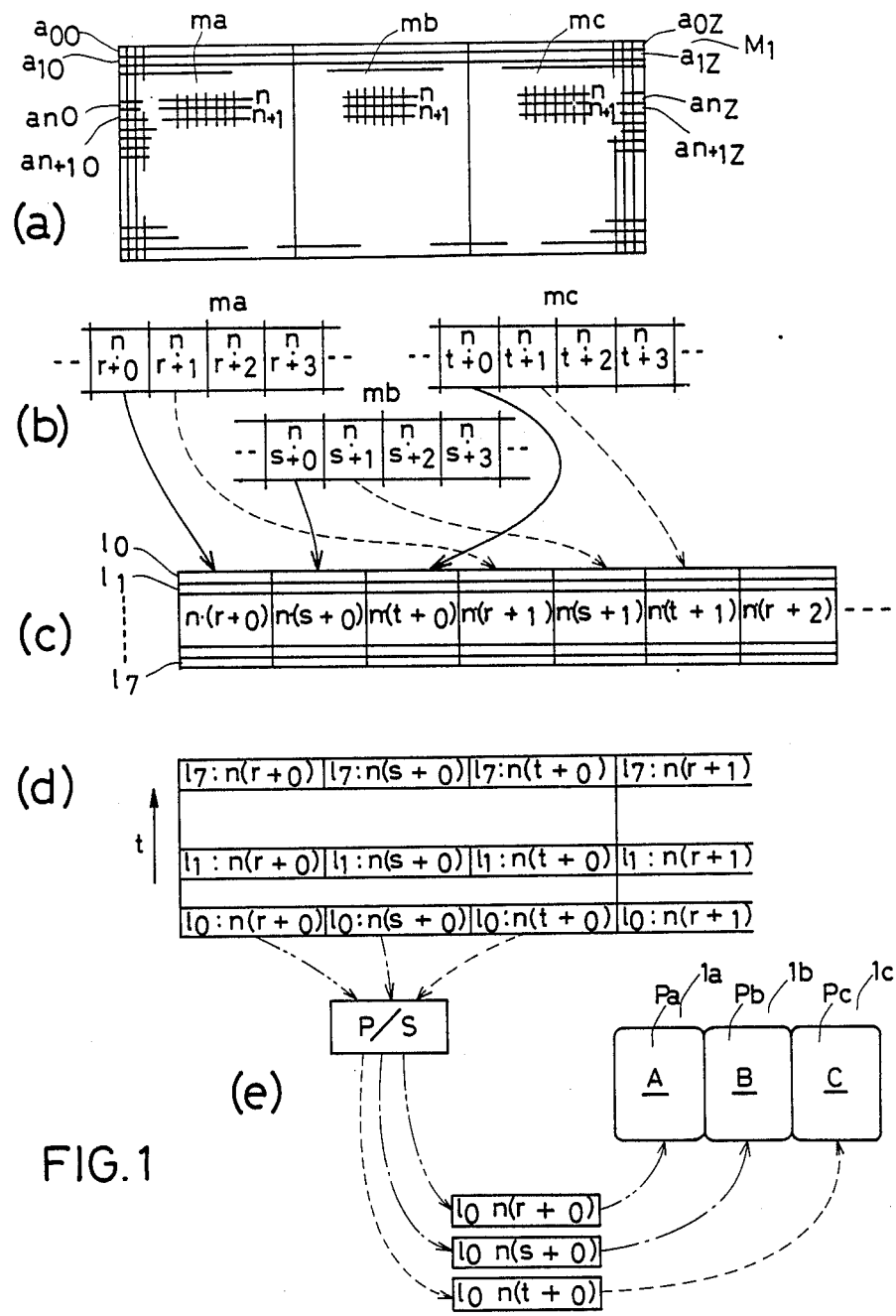
FIG. 1 shows a method of this invention.

FIG. 1 is an outline of the method of this invention, which was made to display a divided, wide, unified picture on screens A, B, C, each of which is comprised of individually operating CRT displaying units $1a$, $1b$, $1c$.

However, it is difficult to display the divided portions of a unified moving picture on the screens A, B, C, each of which is of individually operating CRT displaying devices $1a$, $1b$, $1c$ by using conventional techniques.

Thus, in this invention, the CRT displaying devices $1a$, $1b$, $1c$, are made to operate synchronously, display picture data which are read from a memory $M_1$.

In the memory $M_1$, picture data prepared to be displayed on the CRT screens A, B, C are stored in a memory in such a way that each of a block of memory cells (called "the memory block hereinafter) for $8 \times 8$ picture elements is given an address which is one of consecutive addresses $a_{00} \ldots a_{0z}, a_{10} \ldots a_{1z} \ldots$ Then the pixel data in three memory blocks prepared to be displayed on corresponding Point $P_a$, $P_b$, $P_c$, of each respective screens A, B, C, are read from the memory $M_1$ and distributed to each CRT displaying unit raster-sequentially.

Provided that the addresses of memory blocks located at $m_a$, $m_b$, $m_c$ of the memory $M_1$ corresponding to each point $P_a$, $P_b$, $P_c$ of the image portions displayed on each respective screens A, B, C, are $n \cdot (r+k)$, $n \cdot (s+K)$, and $N \cdot (t+K)$ (k: 0, 1, 2 . . . ) as is shown in FIG. 1(b), at first the data of addresses $n \cdot (r+0)$, $n \cdot (s+0)$, $n \cdot (t+0)$ will be read.

As the data must be read raster-sequentially to each CRT display unit, parallel data of 8 picture elements for a raster line $l_0$ is read from three memory blocks and provided to each CRT displaying unit in the order of $l_0$: $n(r+0)$, $l_0$: $n(s+0)$, $l_0$: $n(t+0)$ as is shown in FIG. 1(d), after undergoing parallel-series conversion as is shown in FIG. 1(e). The reading continues in order of $l_0$: $n \cdot (r+1)$, $l_0$: $n \cdot (s+1)$, $l_0$: $n \cdot (t+1)$ (from next block) . . . $l_1$: $n \cdot (r+0)$, $l_1$: $n \cdot (s+0)$, $l_1$: $n \cdot (t+0)$ (for the next raster line $l_1$). After this routine is concluded for a row n, the same reading is performed for the next row n+1.

In this stage, in order to synchronize the scanning speed of CRT displaying unit with the reading speed of the data from memory $M_1$ in three blocks at a time dot data for one raster line contained in three blocks of memory $M_1$ must be read within a time the same number of dots are scanned in one raster line.

Meanwhile, as the data signal of picture elements read from memory M1 is an 8-bit parallel signal, it takes a comparatively long time to make the signal available for displaying because there is involved a procedure of converting it to a series signal.

Indeed, the aforesaid method is suitable for displaying static pictures, but not for active pcitures. Moveover, as an active picture is often displayed on a part of a screen, there is a lesser need to prepare a memory for all the picture elements. So a method shown in FIG. 2 is provided for such active pcitures in this ivnention.

Specified data of a pciture pattern are stored in a memory $M_{2a}$, each of which data, provided for $8 \times 8$ picture elements for example, is read in one block at a time.

Supposing that a data block $X_0$ and a data block $X_1$ of the memory $M_{2a}$ for displaying pattern Q are prepared to be read as is shown in FIG. 2(b) to display the pattern Q on a point $P'_b$ of a central CRT screen B, at first parallel data signal of $l_0X_0$ and $l_0X_1$, each of which if for 8 picture elements are read raster-sequentially as is shown in FIG. 2(c) and then stored into a line memory $M_{2b}$ for each raster line at a time with addresses $A_h$ after being converted into a series signal. In this case as there is no need to display pictures on CRT screens A, C and rest area of a CRT screen B, null data are given to their dots (practically to write no data into them has same meanings) with the addresses $A_h$ and stored into a line memory $M_{2b}$ in the same way.

In like manner, the data stored in the line memory $M_{2b}$ for all the picture elements of the CRT screens are read successively and distributed to each of the CRT screens.

Figure 3:
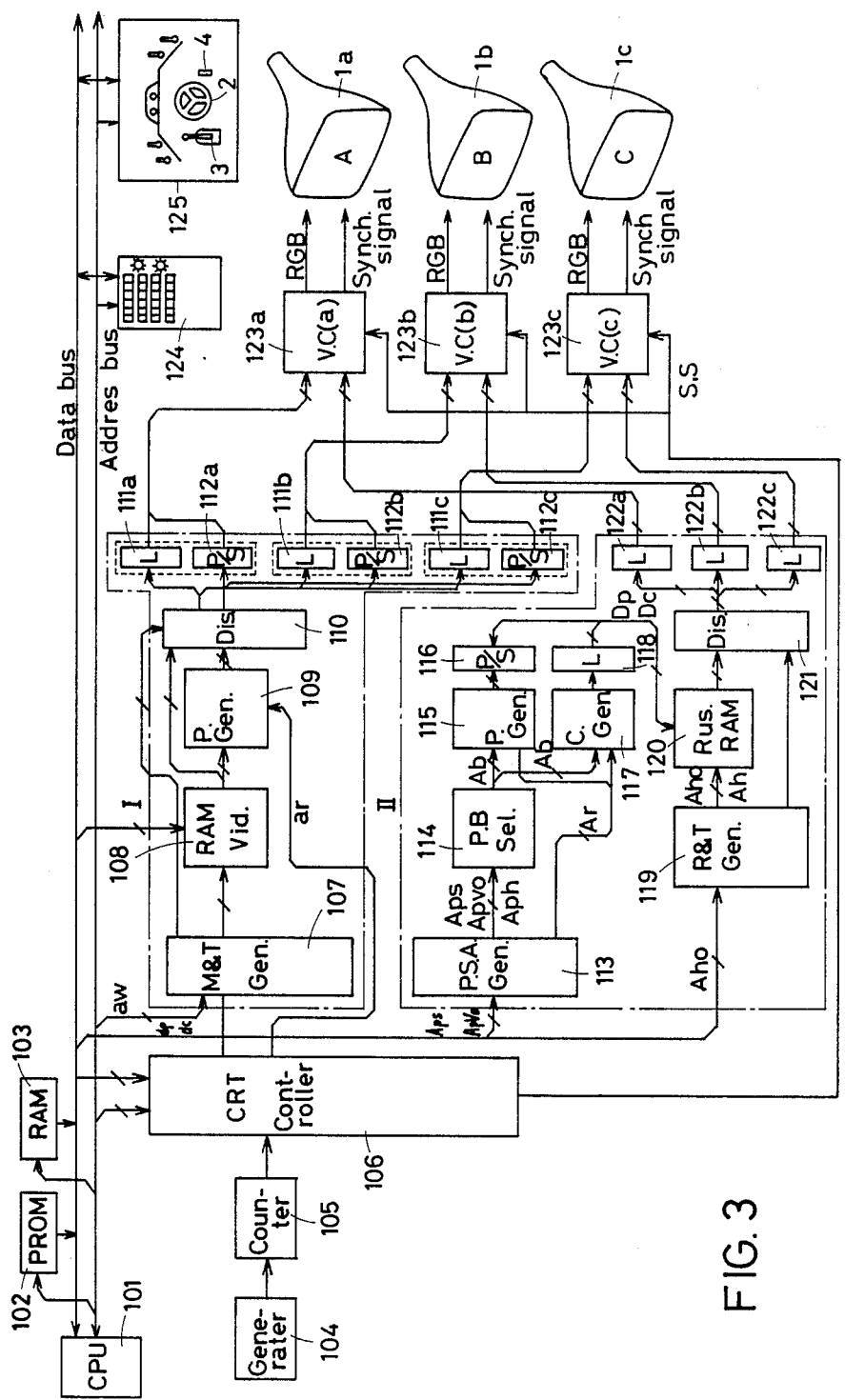
FIG. 3 is a block diagram of an embodiment of this invention.

FIG. 3 is a block diagram of an embodiment of this invention which has three CRT screens.

A CPU101 controls picture data for multiple CRT screens by commanding a PROM102 for generating program sequences successively and a RAM103.

A CRT controller 106 mangages timing of the whole circuit under command of the CPU101.

A first picture disposition cirucit I is a unit of dealing static or compartively slow-motion pictures, in which a video RAM108 and a pattern generator 109 is equivalent to the memory $M_1$ shown in FIG. 1. Concerning to the pattern data, they are handled in data blocks, for example in blocks for $8 \times 8$ picture elements.

A multiplexer and Timing generator 107 writes signals of a video RAM write address $a_w$, a pattern selecting data $d_p$, color data $d_c$ which are read from CPU101 into the video RAM108. Precisely, said video RAM write address signals $a_w$ is consecutively numbered in a way that if the memory $M_1$ has 200 blocks laterally, number 0 is given to an address $a_{00}$ shown in FIG. 1(a) likewise 199 for $a_{0z}$, 200 for $a_{11}$, 399 for $a_{1z}$... Then the designated address signal stored in the video RAM108 are read to the pattern generator 109 by using lateral read address signals $a_{Rh}$ generated in the multiplexer and timing generator 107 and longitudinal read address signals $a_{Rv}$ to take out the corresponding one block of picture pattern data from said pattern generator 109. As is mentioned before said lateral read address signals don't have consecutive numbers because the data of picture elements for points $P_a$, $P_b$, $P_c$, each is of respective CRT screens A, B, C are to be read at the same time. After a certain block is designated, picture signals are read raster-sequentially being controlled by raster address signals from CRT controller 106. Coinciding with the reading of pattern data, corresponding color data are read from designated area of the video RAM108, and then distributed into three latches 111a, 111b, 111c and P/S converters 112a, 112b, 112c by a distributor 110. The latches 111a, 111b, 111c substain the color data signal $d_c$ while the P/S converters 112a, 112b, 112c convert pattern data signal $d_p$ from the pattern generator 109 from parallel into series, both signals are input to video controllers 123a, 123b, 123c synchronously.

A second picture disposition circuit II is a unit dealing with comparatively quick-motion pictures as well as pictures which overlap on another objects (also mentioned before based on FIG. 2), a pattern block selector 114, a pattern generator 115, a color gnerator 117 are equivalent to said memory $M_{2a}$, and a raster RAM120 is equivalent to said memory $M_{2b}$.

A pattern select address generator 113 puts signals, which are a pattern select address signal $A_{ps}$ and a longitudinal first address signal $A_{pvo}$ from the CPU 101 and a lateral pattern address signal $A_{ph}$ generated in said circuit 113, into the pattern block selector 114 in order to read an address signal $(A_b)$ to designate a corresponding memory block of the pattern generator 115 which contains pattern data and a color generator 117 which contains color data. Under command of the pattern block read address signal $A_b$ from the pattern block selector 114 and a raster address signal $A_r$ from the pattern select address generator 113, data for one raster line (8 dots) stored in a memory block of the pattern generator 115 are brought to a P/S converter 116, while color data are kept on a latch 118. In other words, pattern data $D_p$ for 8 picture elements such as $l_0X_0$, $l_0X_1$... (shown in FIG. 2(c)) are input to the P/S converter 116 and the color data $D_c$ are kept on the latch 118. A parallel pattern data signal $D_p$ are converted into a series signal, which signal and the color data signal kept on the latch 118 are input to the raster RAM120 for each one dot (shown in FIG. 2(d)). A raster RAM address and R/W timing generator 119 holds a lateral first address signal $A_{hD}$ (provided that a pattern is to be displayed on the point $P'_b$ of a central CRT screen B, which address $A_{hD}$ is for a referential picture element.) and generates the lateral address signal $A_h$ in synchronization with the pattern data signal $D_p$ from the P/S converter 116 and the color data signal $D_c$ from the latch 118 to write dot data (pattern and color data) into proper rows of memory cells of the raster RAM120.

Said address signal $A_h$ is provided for the purpose of reading every dot data from designated area of the raster RAM120 (shown in FIG. 2(e)). Said circuit 119 has a counter to distribute the data signal to each CRT screen through a distributor 121 synchronously.

Latches 122a, 112b, 122c sustain every dot data for a while and output the data to the video controllers 123a, 123b, 123c. The video controllers 123a, 123b, 123c perform various functions such as an operation of determining priority between data signals of picture patterns when overlapped reading is practiced or converting a color signal into signals of R. G. B. color components, which controllers finally output a horizontal synchronizing signal, a vertical synchronizing signal, and said R. G. B signals to CRT displaying units. In FIG. 3, a unit 124 is an output device and a unit 125 is an input device which possesses a steering wheel 2, a clutch pedal 3, an accelerator pedal 4 etc. ...

FIG. 4 is provided for explaining the detail of said first picture disposition circuit I, and the following is an explanation of a writing process and a reading process of dot data for the video RAM108.

The video RAM108 has enough capacity for generating picture patterns to be supplied to three CRT screens, being controlled by signals of video RAM write address $a_w$ brought from the CPU101 during display blanking times, the pattern selecting data $d_p$ and color data $d_c$ are written into said RAM108 with consequent addresses for displaying a picture.

A multiplexer 107-7 performs changeover between data signal of the write address signals $a_w$ from CPU101 (for writing time) and a set of the lateral read address signal $a_{Rh}$ form a lateral address counter 107-2 through summing circuit 107-4 (mentioned later) and a longitudinal read address signal $a_{Rv}$ from the CRT controller 106 (for reading time). In the writing stageof said video RAM108, a signal of first address $a_{Rho}$ of the lateral address counter 107-2 is written at the same time.

In the reading stage of the video RAM108, said first address signal $A_{Rho}$ is read from the video RAM108 at a blanking time of vertical scanning, being held on a latch 107-1, and then input to the lateral address counter 107-2 slightly before being put into scanning to start counting with beginning of raster scanning. The block address of the video RAM108 is designated by an address signal obtained through the summing circuit 107-4, i.e., the lateral read address signal $a_{Rh}$ and the longitudinal address signal $a_{Rv}$ form the CRT controller 106. In this case, addresses of three blocks of RAM108 for the same position of CRT screen must be read simultaneously as is mentioned before.

The following is an explanation for a realization of the above method.

Address and color data for displaying on the CRT screens divided image portions A, B, C, stored in the video RAM108 as data blocks, are now supposed as being a 10 bit signal and the two most significant, or highest, bits of which are an address signal prepared for switching CRT screens in such a way that if they are 00, a screen A are displayed, likewise 01 for a screen B, and 11 for a screen C. The lateral address signal changes said two highest bits successively in between said three forms to read designated data from each of the corresponding blocks with a time $T_0$, that is one third of that for displaying one raster line on one screen.

Figure 5:
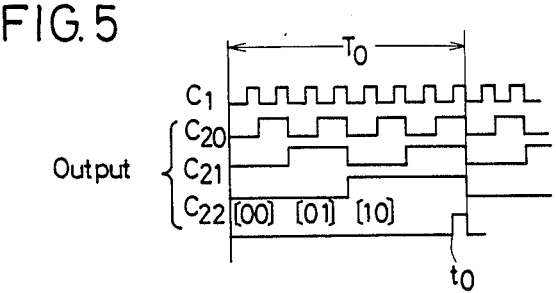
FIG. 5 is a timing chart of an output signal of a lower figure counter.

More precisely with reference to FIG. 5, a clock signal $C_1$ synchronized with a time for displaying one dot is input to a lower figure counter 107-3 and three bit signals of its two-fold cycle $C_{20}$, four-fold cycle $C_{21}$, eight-fold cycle $C_{22}$ are output from the counter 107-8. When said counter 107-3 counts 8 pulses of clock signal $C_1$ (time to), a block signal $S_0$ is output from an AND-gate 107-5 which obtained said 3 bit signals $C_{20}$, $C_{21}$, $C_{22}$ into the lateral address counter 107-2. As the output signal of said counter 107-2 is a counted number signal of the block signal $S_0$, which output signal is no other than a lateral address signal to be given to each memory block.

And as the two highest bits of the three bit output signal from said lower figure counter 107-3 are composing said signal rotating in order of 00, 01, 10 within a time $T_0$ for 1 block, which signal is input to the summing circuit 107-4 to be added to the highest two bits of a number being counted in the lateral address counter 107-2. Thereby are obtained three address signals corresponding to same points on each CRT screen from the summing circuit 107-4. A pattern address signal $a_p$ and a color data signal $D_c$ for the pattern generator 109 are read from a certain position of the video RAM108 which is designated by using the above signals and longitudinal address signals from a CRT controller 106. Then, according to said address signal and the raster address signal $a_r$ from the CRT controller 106, the pattern data signal $d_p$ read from pattern generator 109 is held on latches 110-2a, 110-2b, 110-2c and a color data read from video RAM108 is held on latches 110-1a, 110-1b, 110-1c as follows. That is, latches are controlled by screen selecting signals $S_A$, $S_B$, $S_C$ which are outputs from a decoder 107-6 which decodes the two highest bits of a number counted in said lower figure counter 107-3, which output data signal $d_p$ and an output from color data signal $d_c$ are mixed and distributed to latches for each CRT screen.

Figure 6:
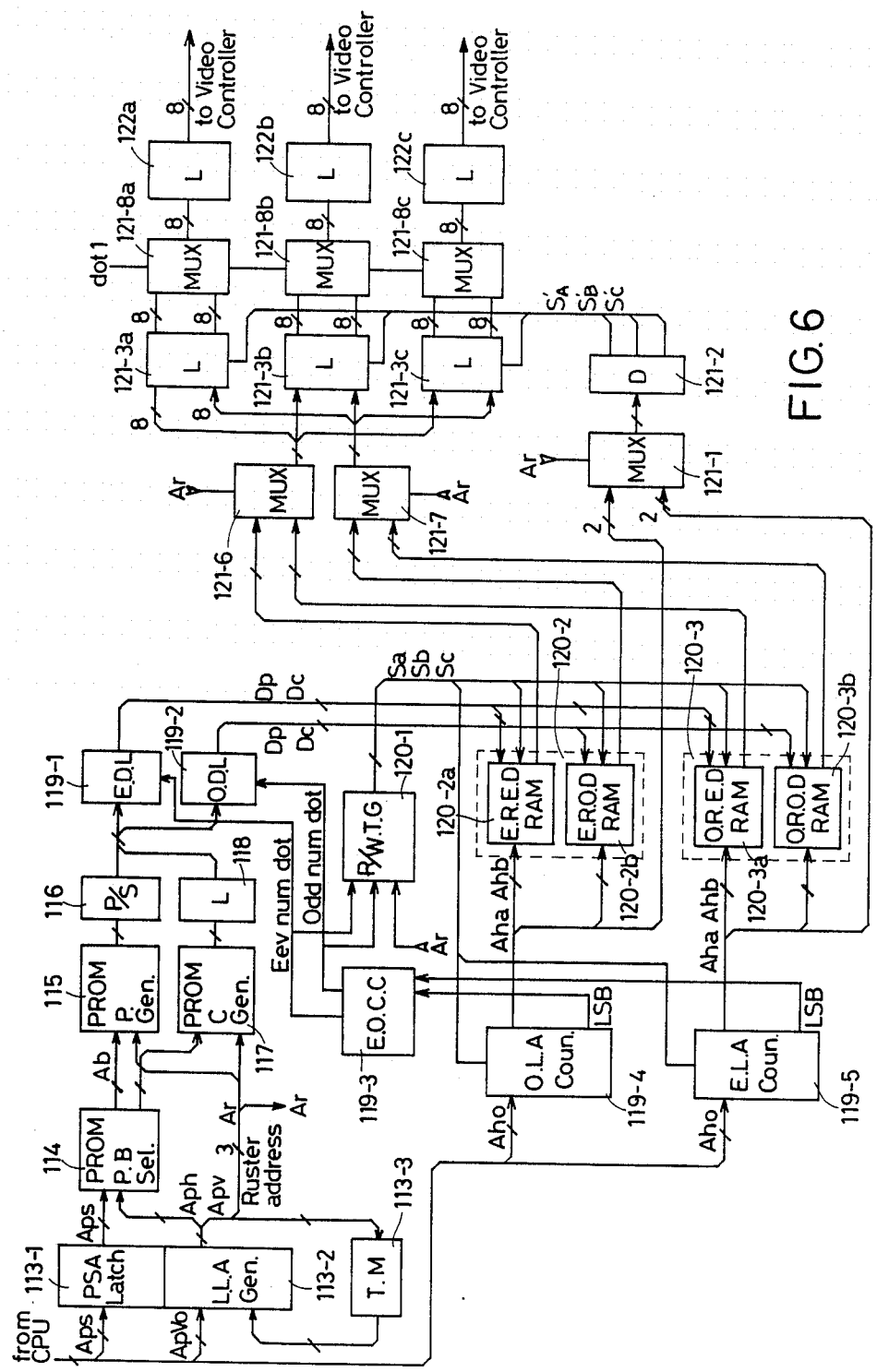
FIG. 6 is a detailed block chart of a second picture disposition circuit.

FIG. 6 shows a detailed structure of the second picture disposition circuit II.

As first, data of picture elements (for example $X_0$, $X_1$ shown in FIG. 2(b)) for composing pictures are stored in 8×8 blocks in the pattern generator 115, so that a specified picture pattern (for example a character A) can be obtained from a combination of such data blocks. The pattern block selector 114 stores address numbers of said blocks of dot data in order to realize possible combination patterns. And when a specified pattern select address signal held on a pattern select address latch 113-1 is designated by the CPU101, corresponding multiple bock addresses are designated and the data are read to be provided to display a pattern as is shown in FIG. 2(a).

More precisely, at first a pattern select address of a desired picture to be displayed (for example a character A) is inputted beforehand to the pattern select address latch 113-1 from the CPU1, while a longitudinal first address $A_{pvo}$ for pattern block selector 114 is input beforehand from the CPU1 to a lateral and longitudinal address generator 113-2. Then with use of the pattern select address signal $A_{ps}$ held on a pattern select address latch 113-1 and a lateral and longitudinal address signals $A_{ph}$, $A_{pv}$ determined on said signals, the pattern block address signal $A_b$ is generated in the pattern block selector 114. A pattern data $D_p$ for a specified raster line stored in a memory block of a pattern generator 115-1 and a color data $D_c$ for the raster line generated in the generator 117 are read synchronously with the raster address signal $A_r$ (in this case, $A_r$ is the three lowest bits of a lateral address signal $A_{ps}$ (FIG. 2(c)).

This reading routine is repeated until all the picture data for an object is completed, and the pattern data signal $D_p$ are input to the P/S converter 116, while the color data signal $D_c$ are inputted and held on the latch 118.

By the way the method of this invention adopts a temporary memory 113-3 to control reading timing of data, $D_p$, $D_c$ for each raster line and to perform vertical enlarging or reducing for picture data. But as it is not the main factor of this invention, explanation of the same is omitted.

The P/S converter 116 converts a parallel data signal into a series signal and inputs dot data through latches 119-1, 119-2 to a raster RAM120-2 and a raster RAM120-3. In this stage it is possible to perform overlapped reading or thinned reading of the data to perform enlarging or reducing of the image, but explanation thereof is omitted because it is not a main factor of this invention.

By using signals of three lowest bits $A_h$ of the number counted in lateral address counters 119-4, 119-5 a dot data changeover circuit 119-3 determines whether the address signal $A_h$ is an odd number or an even number to changeover said latches 119-1, 119-2, whereupon the latch 119-1 is used for holding dot data of even number addresses, while the latch 119-2 is used for holding dot data of odd number addresses.

A raster RAM120-2 and a raster RAM120-3, which are memory units for storing picture data, operate in such a way that the data signal is written into the odd number raster RAM120-3 when a stored data signal is read from the even number raster RAM120-2. On the contrary the data signal is written into the even number raster RAM120-2 when a stored signal is read from the odd number raster RAM120-3.

Said even number raster RAM120-2 consists of an even number dot RAM120-2a and an odd number dot RAM120-2b, while said odd number raster RAM120-3 consists of an even number dot RAM120-3a and an odd number dot RAM, which perform reading or writing functions under control of an even number dot signal $S_a$, an odd number dot signal $S_b$ and a raster signal $S_r$ from a R/W controller 120-1.

The lateral address counters 119-4, 119-5 are provided for giving lateral addresses $A_h(A_{ha}, A_{hb})$ to the data which are to be input to the reaster RAM120-2 and the raster RAM120-3. Taking the lateral address counter 119-4 for an explanation, similarly to the above manner, a lateral first address signal $A_{ho}$ is input from the CPU1 to determine on which part the designated pattern data stored in the raster RAM must be displayed on the CRT screens A, B, C.

And while store data are displayed on the CRT screens, a counter 119-4 gives lateral even number addresses $A_{ha}$ for the data which is to be written into the raster RAM120-2 while counting the number of the address from lateral first address $A_{ho}$ for every dot data. Said counter also gives the addresses to every dot pattern data $D_p$ and to color data $D_c$ to store them into two units of even number raster RAM120-2a, 120-2b, so address signals given no data is equivalent to that with null data. In said situation, the pattern data address signal $D_p$ for each even number raster RAM120-2a, 120-2b is to be given one address for each, therefore, simultaneous writing for each RA can be performed within 1 dot time (a time for displaying one dot on a CRT screen) resulting in reduction of time.

Data of picture element for one raster line of the CRT screens A, B, C are distributed in the group of even number dot data to the raster RAM120-2 and in a group of odd number dot data to the raster RAM120-3 with consecutive number $A_h$ for each group (as is shown in FIG. 2(d)), while the latches 119-1, 119-2 provide pattern data $D_p$ and color data $D_c$ to proper lateral position of said two units of the raster RAM120-2, 120-3 under command of the R/W controller 120-1.

As for reading data from two units of the raster RAM120-2, 120-3, dot data to be displayed on the same points $P'_a$, $P'_b$, $P'_c$ of each respective CRT screens are read while 1 dot data are displayed.

Figure 7:
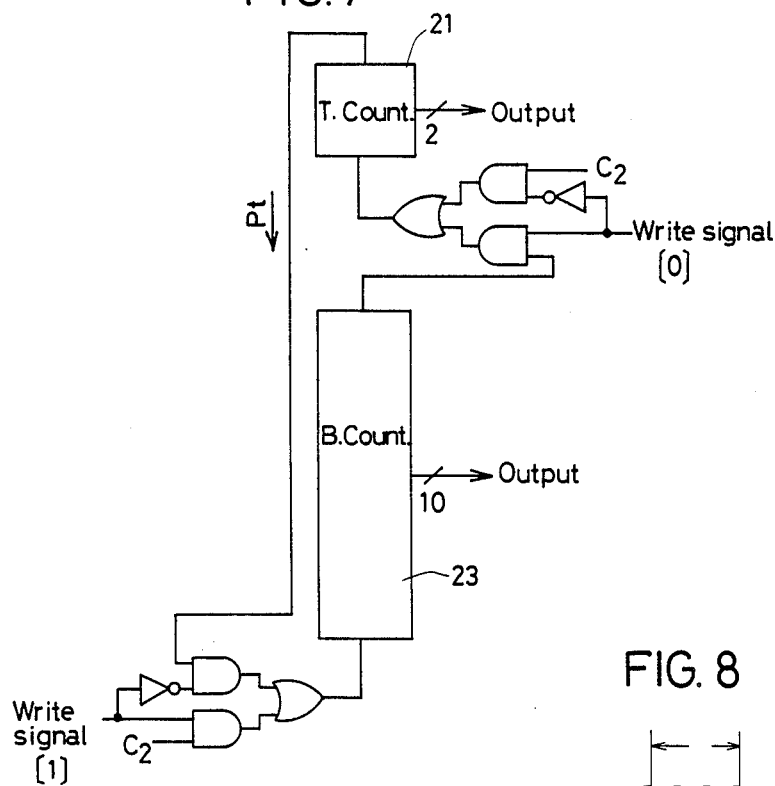
FIG. 7 is a changeover circuit for a trinary counter.
Figure 8:
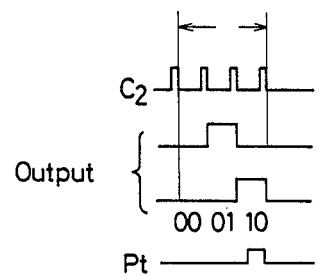
FIG. 8 is a timing chart of an input signal and an output signal of a trinary counter.

Changeover between the CRT screens is performed by a counter 21 (shown in FIG. 7) of each lateral address counter in a way of obtaining a 2 bit signal which changes form in order of 00, 01, 10 within a time in which one dot data is displayed from said trinary counter 21 as is shown in FIG. 8.

Some supplemental explanation for operation of said trinary counter 21 is as follows. At first connecting the highest two bits of the number counted in the trinary counter 21 to the head of the number counted in the binary counter 23, whereby a clock signal $C_2$ is input to the binary counter 23 which counts the number of dots of a CRT screen to consequently advance the count of the trinary counter in order of 00, 01, 10 when data is written into the raster RAM120, or a clock signal $C_2$ is input to the trinary counter 21 to directly advance the count of the trinary counter 21 in order of 00, 01, 10 when data is written into the raster RAM120 to read the lateral address signals $A_{ho}$ in order of $00A_{ho}$ (corresponding to the point $P'_a$ of the CRT screen A), $01A_{ho}$ (for point $P'_b$ of the CRT screen B), $10A_{ho}$ (for point $P'_c$ of the CRT screen C) within a time $T_0$ needed for displaying 1 dot of a CRT screen. Then the trinary counter 21 provides a carry signal $P_t$ every 3 pulses of the clock $C_2$ (Time $T_0$ for displaying one picture elements of a CRT screen) to the binary counter 23 to designate the lateral address signals in order of $00A_h$, (for $P'_a$), $01A_h$, (for $P'_b$), $10A_h$, (for $P'_c$) . . . $00A_{h2}$ (for $P'_a$), $01A_{h2}$ (for $P'_b$), $10A_{h2}$ (for $P'_c$) . . . for reading corresponding picture data.

On this, in the even number raster RAM120-2 (120-2a, 120-2b) and the odd number raster RAM120-3 (120-3a, 120-4a), even number dot data and odd number dot data are given the same address signals, the former are inputted to a multiplexer 121-6, while the latter are inputted to a multiplexer 121-6 respectively under command of the lateral address signals when they are given form the lateral address counters 119-4, 119-5 as said before. The multiplexer 121-6 performs changeover between data for even number raster lines and data for odd number raster lines in accordance with the raster address signal $A_r$ for the time of each raster line, likewise the multiplexer 121-7 operates for odd number raster line.

The data of picture elements which are read from two units of the raster RAM120-2, 120-3 time-dividedly are held on latches 121-3a, 121-3b, 121-3c to be distributed to each of screens A, B, C, under command of screen select signals $S_A'$, $S_B'$, $S_C'$.

The multiplexer 121-1 performs changeover between a 2 bit signal from the trinary counter 21 of an even number raster RAM lateral address counter 119-4 and a 2 bit signal from the trinary counter 21 of an even number raster RAM lateral address counter 119-4 and a 2 bit signal from the trinary counter 21 of an odd number raster RAM lateral address counter 119-5 in accordance with the raster address signal $A_r$ which designate even or dot number raster, while a decoder 121-2 inputs the output of the multiplexer 121-1 to obtain screen select signals $S'_A$, $S'_B$, $S'_C$.

Multiplexers 121-8a, 121-8b, 121-8c perform changeover between a signal of even numbered dots and a signal of odd numbered dots to input picture data to latches 122a, 122b, 122c. Said latches 122a, 122b, 122c synchronize time-lagged input data to put a synchronized data into video controllers (a) (b) (c) at the same time.

Figure 9A:
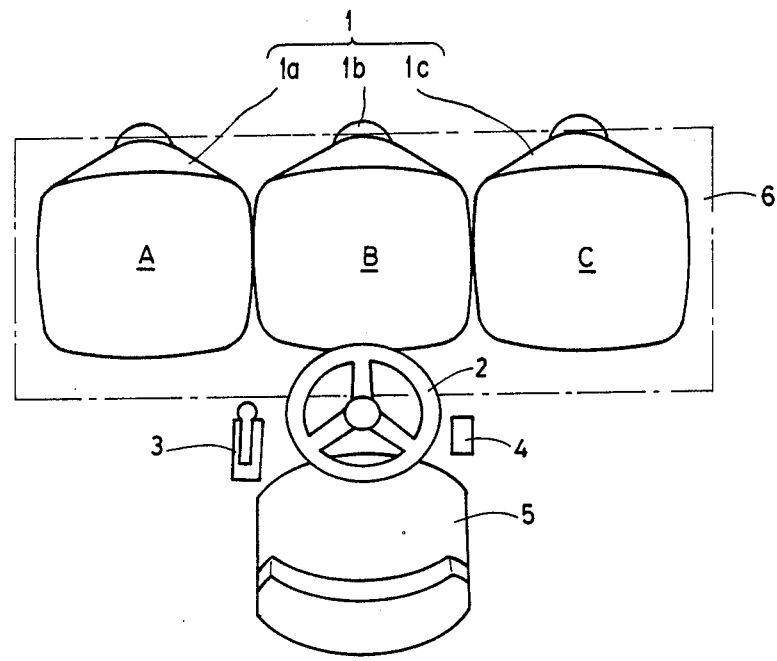
FIG. 9 is an illustrative arrangement of CRT screens according to this invention.
Figure 9B:
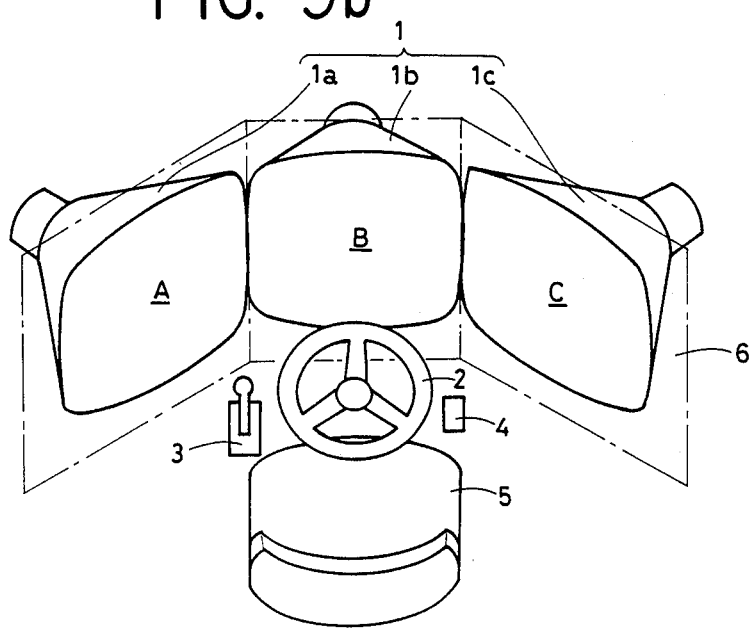

FIG. 9 shows two samples of arrangement of CRT displaying units of this invention when applied to a game machine. In FIG. 9, an example (a) shows that the CRT screens A, B, C are arranged to provide a flat viewing surface in front of player's chair 5, and another example (b) shows the CRT screens A, C arranged in a shape facing to the player's seat 5. A type of arrangement shown in FIG. 9(a) gives players no more than a superficial impression mainly because it is not representative of a player's visual fields. On the contrary to that, a type of arrangement shown in FIG. 9(b) gives players a kind of a three-dimensional image, which leads to more of an on-the-scene feeling for players. In FIG. 9, 6 is a half mirror surface surrounding the screen and provided for masking the edges of CRT screens.

Figure 10A:
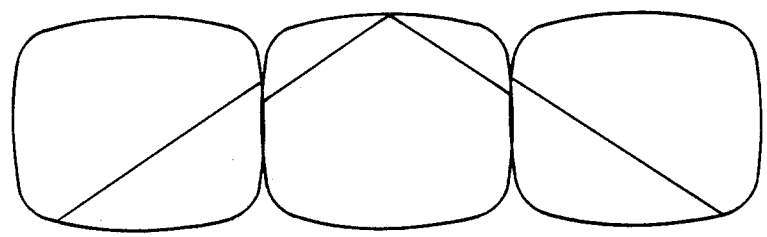
FIG. 10 shows an example for explaining the effect of over-scanning.
Figure 10B:
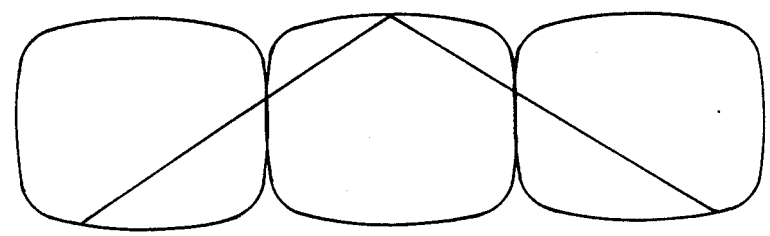

Another skill for improving continuity between each screen face, a method of over-scanning is preferred to be adopted. For example FIG. 10(a) shows a case with no adoption of said method, on the other hand FIG. 10(b) shows a case with the effect of said method resulting in natural continuity of a picture without using the half-mirror 6.

The above is an explanation for the method of this invention in which a picture of an object is divided to a plurality of poritions for display on respective whole screens. However, invention is also capable of displaying an individual picture on each CRT screen (each picture is of course a component for presenting a situation).

Such a method applied to a television game machine with three CRT screens for example, in which game machine the left screen illustratively displays a picture of sallying fighters from a carrier, the right screen displays a picture of just fired interceptor missiles, the middle screen displays a picture of a battle-field, and each of the screens are independent to present a scene.

As is mentioned above, because this invention is capable of presenting a wide unified picture by using readymade CRT screens each of which is designed to operate individually, a method of this invention brings greater satisfaction to players when it is applied to game machines.

We claim:

1. A method of displaying a plurality of portions of a unified picture on multiple spatially adjacent displaying devices comrpises the steps of:
   (a) controlling each of said displaying devices indivdiually while maintaining a synchronized relation among displays provided thereon,
   (b) dividing the unified picture into a plurality of image portions, each of said portions corresponding to a respective one of said displaying devices, storing each of said image portions as data representing a plurality of picture elements in a memory,
   (c) inputting said picture elements data stored in said memory to said displaying devices,
   (d) said step of maintaining a synchronized relation comprising the further step of substantially simultaneously reading from memory picture element data for corresponding locations on each of said plurality of image portions for CRT screens of different ones of said displaying devices and
   (e) wherein said inputting step comprises the step of distributing the picture element data to said corresponding displaying devices.

2. A method of displaying a plurality of portions of a unified picture on multiple spatially adjacent displaying devices comprising the step of:
   (a) controlling each of said displaying devices individually while maintaining a synchronized relation among displays provided thereon,
   (b) dividing the unified picture into a plurality of image portions, each of said portions corresponding to a respective one of said displaying devices, storing each of said image portions as data representing a plurality of picture elements in a memory,
   (c) inputting said picture elements data stored in said memory to said displaying devices,
   (d) said step of maintaining a synchronized relation comprising the further step of substantially simultaneously reading from memory picture element data for corresponding locations on each of said plurality of image portions for CRT screens of different ones of said displaying devices and
   (e) wherein said inputting step comprises the step of distributing the picture element data to said corresponding displaying devices,
   (f) rearranging the picture elements data stored in said memory into picture element units ordered according to a raster scanning sequence for storage in a second memory before distribution to said displaying device,
   (g) said rearranged step comprising the further steps of:
      (i) storing picture elements data belonging to even numbered raster lines of said raster scanning sequence in an even raster memory and
      (ii) storing picture elements data belonging to odd numbered raster lines of said raster scanning sequence in an odd raster memory.

3. A method of displaying a unified picture on multiple displaying devices comprising the steps of:
   (a) controlling each of said displaying devides individually while maintaining a synchronized relation among displays provided thereon, and
   (b) storing picture elements data in consecutive blocks of a memory,
   (c) inputting said picture elements data stored in said memory to said displaying devices,
   (d) said step of maintaining a synchronized relation comprising the further step of substantially simultaneouly reading picture element data for corresponding points of CRT screens of different ones of said displaying devices from said memory and
   (e) wherein said inputting step comprises the step of distributing the picture element data to corresponding displaying devices,
   (f) rearranging the picture elements data stored in blocks in said memory into picture element units ordered according to a raster scanning sequence for storage in a second memory before distribution to said displaying device,
   (g) said rearranging step comprising the further steps of:
      (i) storing picture elements data belonging to even numbered raster lines of said raster scanning sequence in an even raster memory and
      (ii) storing picture elements data belonging to odd numbered raster lines of said raster scanning sequence in an odd raster memory,
   (h) wherein each of said storing steps further comprises the steps of:
      (i) storing data of picture elements having even numbered dots in an even dot memory and
      (ii) storing data of picture elements having odd numbered dots in an odd dot memory,
   wherein said even dot memory and said odd dot memory are provided in each of the even raster memory and the odd raster memory.

4. A method according to claim 2 comprising the further step of reading data from one of said even and odd raster memories substantially simultaneously with a step of writing data into the other of said even and odd raster memories.

5. A method according to claim 3 comprising the further step of writing data substantially simultaneously to both said even dot memory and said odd dot memory of one of said even and odd raster memories and reading data substantially simultaneously from both said even dot memory and said odd dot memory of the other of said even and odd raster memories.

6. A wide display system for displaying a unified image comprised of at least one of a static image and a dynamic image on a wide screen comprising:
   (a) a plurality of individually controlled display device means,
   (b) means for synchronizing said plurality of display device means to provide sychronized displays thereon,
   (c) means responsive to rate of of change of image elements for identifying static image elements, defined as image elements changing at rates of change below a predetermined rate, and dynamic image elements, defined as image elements changing at rates of change above said predetermined rate,
   (d) static image processing means for displaying said static image elements,
   (e) dynamic image processing means for displaying said dynamic image elements, and
   (f) said identifying means sending said static and dynamic image elements identified thereby to said static and dynamic image processing means, respectively, and (g) means for combining said static and dynamic image elements respectively processed by said static and dynamic processing means into combined images displayed by said plurality of display device means.

7. A wide display system as recited in claim 6, wherein said plurality of display device means comprises a plurality of raster scanned CRT displays.

8. A wide display system as recited in claim 6 wherein said static image processing means includes first, static, image memory means for storing said static image elements and first, static, control means for reading said static image elements and for displaying said static image elements on said display device means, and wherein said dynamic image processing means includes second, dynamic, image memory means for storing said dynamic image elements and second, dynamic, control means for reading said dynamic image elements and for displaying said dynamic image elements on said display device means.

9. A wide display system as recited in claim 6 wherein said static image processing means is operable for reading out in parallel a plurality of static image elements formed of n picture elements for display by said plurality of display device means at corresponding positions thereon and for distributing said plurality of static image elements to said plural display device means.

10. A wide display system as recited in claim 8 wherein said static image processing means includes means for storing groups of n×n picture elements at each address of said static memory means for display in corresponding positions on each of said display device means, and reading means for reading different groups of n of said static picture elements for display on one raster of said plurality of display device means from a designated address in said static memory means and means for providing respective ones of said groups of picture elements to corresponding display device means.

11. A wide display system as recited in claim 10 wherein said static memory means comprises ROM means for storing a plurality of image pattern data and RAM means for storing address data of image pattern data and RAM means for storing address data for designating display addresses for said image pattern data.

12. A wide display system as recited in claim 11 wherein said dynamic image processing means is operable for reading from said dynamic memory means any of said dynamic image elements to be displayed at corresponding locations on said plural display device means and for distributing said dynamic image elements to said plural display device means.

13. A wide display system as recited in claim 8 wherein said dynamic image processing means is operable for reading from said dynamic memory means any of said dynamic image elements to be displayed at corresponding locations on said plural display device means and for distributing said dynamic image elements to said plural display device means.

14. A wide display system as recited in claim 13 wherein said dynamic memory means comprises first storage means for storing dynamic image elements for display on said plural display device means and second storage means for storing dynamic image elements in a sequence as read from said first storage means.

15. A wide display system as recited in claim 14 wherein said first storage means comprises ROM means for storing a plurality of image pattern data and RAM means for storing address data for designating display addresses for said pattern data.

16. A wide display system as recited in claim 15 wherein said plurality of display device means comprise a plurality of raster scanned CRT displays, and where said second storage means comprises even storage means for storing dynamic image elements for even numbered raster lines and odd dynamic image elements for odd numbered raster lines, and means for writing into one of said even and odd storage means while reading from the other of said even and odd storage means.

17. A wide display system as recited in claim 16 wherein each of said image patterndata is stored in said dynamic image memory means as a block of n×m picture elements wherein n and m are integers.

18. A wide display system as recited in claim 17 wherein each of said even and odd storage means comprises even dot and odd dot storage means for storing picture elements of even and odd numbered dots of said even and odd number raster lines, respectively and means for simultaneously reading or writing in both said even dot and said odd dot storage means of said even storage means, or of said odd storage means.

19. A wide display system as recited in claim 9 wherein said static image processing means comprises parallel-to-serial conversion means.

20. A wide display system as recited in claim 13 wherein said dynamic image processing means comprises parallel-to-serial conversion means.

21. A wide display system as recited in claim 7 wherein said plurality of CRT displays are contiguous to one another in a straight line, each of said displays being angled to be at a substantially common distance from a fixed point for seating an operator.

22. A method as recited in claim 1, wherein said inputting step comprises the further step of:
(a) rearranging the picture elements data stored in said memory into picture element units ordered according to a raster scanning sequence for storage in a second memory,
(b) said second memory having four memory storage areas therein, including first and second memory areas for storage of even and odd raster lines of said raster scanning sequence, respectively,
(c) each of said first and second areas comprising separate odd and even memory areas for storage of odd and even dots of said even and odd raster lines, respectively,
(d) said step of rearranging the picture elements dat comprising the further steps of
(i) storing picture elements data belonging to even numbered raster lines of said raster scanning sequence and having even numbered raster dots in said even memory area of said first memory area for storage of even raster lines,
(ii) storing picture elements data belonging to even numbered raster lines of said raster scanning sequence and having odd numbered raster dots in said odd memory area of said first memory area for storage of even raster lines,
(iii) storing picture elements data belonging to odd numbered raster lines of said raster scanning sequence and having even numered raster dots in said even memory area of said second memory area for storage of odd raster lines, and (iv) storing picture elements data belonging to odd numbered raster lines of said raster scanning sequence and having odd numbered raster dots in said odd memory area of said second memory area for storage of odd raster lines.

23. A method as recited in claim 2, wherein said rearranging step further comprises the steps of:
(iii) storing data of picture elements having even numbered dots in an even dot memory, and
(iv) storing data of picture elements having odd numbered dots in an odd dot memory,
wherein said even dot memory and said odd dot memory are provided in each of the even raster memory and the odd raster memory.

* * * * *